(12) United States Patent
Angellieri et al.

(10) Patent No.: US 6,359,728 B1
(45) Date of Patent: Mar. 19, 2002

(54) PUMP DEVICE FOR PUMPING AN ACTIVE FIBER OF AN OPTICAL AMPLIFIER AND CORRESPONDING OPTICAL AMPLIFIER

(75) Inventors: Marco Angellieri, Parma; Roberta Castagnetti, Monza; Giovanni Sacchi, Milan, all of (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/400,274

(22) Filed: Sep. 21, 1999

Related U.S. Application Data
(60) Provisional application No. 60/102,717, filed on Oct. 1, 1998.

Foreign Application Priority Data
Sep. 22, 1998 (EP) .............................................. 98 117899

(51) Int. Cl.⁷ .............................................................. H01S 3/00
(52) U.S. Cl. ......................................... 359/341; 359/345
(58) Field of Search .................................. 359/341, 345

(56) References Cited

U.S. PATENT DOCUMENTS
5,808,786 A * 9/1998 Shibuya ...................... 359/341

FOREIGN PATENT DOCUMENTS

| | | |
|---|---|---|
| EP | 0 779 687 A2 | 6/1997 |
| EP | 0 899 834 A1 | 3/1999 |
| EP | 0 899 837 A1 | 3/1999 |
| JP | 11135868 * | 5/1999 |
| JP | 11136193 * | 5/1999 |
| WO | WO 95/10868 | 4/1995 |
| WO | WO 96/20519 | 7/1996 |

* cited by examiner

*Primary Examiner*—Mark Hellner
(74) *Attorney, Agent, or Firm*—Finnegan, Henderson, Farabow, Garrett & Dunner, L.L.P.

(57) ABSTRACT

A pump device to couple a pump radiation to an active optical fiber adapted to amplify optical signals, includes a first optical coupler (150) that optically couples a first fraction of the pump radiation (145) to the active fiber (130) and has an insertion loss for the optical signals less than or equal to 0,2 dB; and a second optical coupler (160) that is optically coupled to the first coupler (150) to receive from the first coupler (150) a second fraction of the pump radiation, that is further optically coupled to the active fiber (130) for feeding to the active fiber (130) at least part of the second fraction of the pump radiation and that has a coupling efficiency for the pump radiation of at least 70%.

19 Claims, 10 Drawing Sheets

PUMP DEVICE FOR PUMPING AN ACTIVE FIBER OF AN OPTICAL AMPLIFIER AND CORRESPONDING OPTICAL AMPLIFIER

This Appln claims the benefit of Provisional Ser. No. 60/102,717 filed Oct. 1, 1998.

It is an object of the present invention to provide a pump device for pumping an active fiber of an optical amplifier. In particular, it is an object of the present invention to provide a pump device for coupling a pump radiation to an an optical amplifier adapted to be used in an optical transmission system, for example a wavelength division multiplexing (WDM) optical transmission system. The invention also relates to an optical amplifier that uses the above mentioned pump device.

Conventional optical fiber amplifiers include active fibers having a core doped with a rare earth element. Pump power at a characteristic wavelength for the rare earth element, when injected into the active fiber, excites the ions of the rare earth element, leading to gain in the core for an information signal propagating along the fiber.

Rare earth elements used for doping typically include Erbium (Er), Neodymium (Nd), Ytterbium (Yb), Samarium (Sm), and Praseodymium (Pr). The particular rare earth element or elements used is determined in accordance with the wavelength of the input signal light and the wavelength of the pump light. For example, Er ions would be used for input signal light having a wavelength of 1.55 μm and for pump power having a wavelength of 1.48 μm or 0.98 μm; co-doping with Er and Yb ions, further, allows different and broader pump wavelength bands to be used.

Traditional pump sources include single mode laser diodes and multi-mode broad area lasers coupled to the active fiber over single mode and multi-mode pumping fibers, respectively, to provide the pump power. Single mode lasers provide low pump power, typically in the order of 100 mW. Broad area lasers, on the other hand, provide high pump power, in the order of 500 mW. These lasers of high output power, however, cannot efficiently inject light into the small core of a single mode fiber. Consequently, the use of high power broad area lasers requires the use of wide core and multi-mode fibers for pumping optical amplifiers. This non-active pumping fiber in turn typically inputs the pump power through a coupler and into the active fiber, for example into the inner cladding of a double-clad active fiber, acting as a multi-mode core for the pump power.

In a double-clad amplifier fiber, pump power is guided into the inner multi-mode cladding of the fiber from which it is transferred into a single mode core doped with an active dopant. The double-cladding fiber pumping mechanism is described for example in WO 95/10868. This document discloses a fiber optic amplifier comprising a fiber with two concentric cores. Pump power provided by multi-mode sources couples transversely to the outer core (equivalent to an inner cladding) of the fiber through multi-mode fibers and multi-mode optical couplers. The pump power propagates through the outer core and interacts with the inner core to pump active material contained in the inner core. This pumping technique is also described in U.S. Pat. No. 5,291,501, which illustrates a mono-mode optical fiber with doped core and doped inner cladding.

A well-known basic amplifying system includes a multi-mode pump source coupled to an amplification fiber, for example an ErNb doped doubleclad fiber, via a conventional fused fiber wavelength division multiplexer (WDM) type coupler. WDM couplers behave as multi-mode couplers for the pump power and transmit the single mode signals along the amplification fiber substantially without coupling to the pump fiber. During the pumping operation, most of the outer modes of the pump power are transmitted to the amplification fiber, leaving the inner modes of the pump power unused. In the case of a multi-mode or a double cladding amplifier fiber, a fused fiber coupler has a theoretical coupling coefficient directly proportional to the ratio of the areas of the two fibers constituting the coupler itself. In an ideal case for two identical fibers, the coupling coefficient is approximately 50%, but in practice it is in the range of 45–48%. This means that only about 45–48% of the total pump power passes from the pumping fiber into the inner cladding of the double-clad active fiber, while the remaining 52–55% remains in the pumping fiber.

Some systems use two optical fibers having different diameter of cores to improve the coupling coefficient of the multi-mode coupler. However, such arrangements often lead to a waste of power due to the difficulty in matching the tapering of two cores of different size.

To increase the coupling efficiency, the Applicant has considered the possibility of using micro optic couplers. Micro optic couplers couple optical beams using a wavelength selective mirror and a focusing lens system. With this construction, micro optic couplers obtain much better coupling efficiencies than traditional WDM couplers, typically in the range of 89%. Applicant has remarked that micro optic couplers have several drawbacks that limit their use for pump coupling in fiber amplifiers. In particular, if a single micro optic coupler is used upstream of the active fiber so as to feed the pump radiation to the active fiber in a co-propagating direction, the transmission signals passing through the coupler undergo a power loss that is much higher than the loss introduced by a fused fiber coupler and that may be excessive (particularly in consideration of the fact that the signals undergo the attenuation before being amplified and this leads to an increase of the noise figure for the amplifier). Alternatively, if a single micro optic coupler is positioned down-line with respect to the active fiber so as to feed the pump radiation to the active fiber in a counter-propagating direction, the signal to noise ratio undergoes a reduction which again may be excessive. Moreover, due to high coupling efficiency achievable by using a micro optic coupler, and then to the high pump power fed into the fiber, an inhomogeneous distribution of the population inversion is produced along the fiber.

More recent systems have attempted to recover the lost pump power in a conventional fused fiber coupler by means of different pumping schemes using fused fiber couplers. In particular, different solutions have been proposed that include a second optical coupler in addition to a first optical coupler positioned according to the above-described single-coupler arrangement. The second coupler is positioned at the opposite end of the active fiber with respect to the first coupler and is coupled to the first coupler through a multi-mode pump fiber so as to receive the residual pump power (i.e. the fraction of the pump power that has not been directly fed to the active fiber by means of the first coupler). The second coupler is then adapted to couple the residual pump power to the same active fiber in a counter-propagating direction, or to a different active fiber in a copropagating direction. The proposed pumping schemes using the above-mentioned technique to recover the pump power include only couplers of the fused fiber type. The Applicant observed that the addition of a second fused fiber coupler does not significantly improve the total pump power transfer over the single-coupler system described above. In fact, the second coupler receives from the pump fiber prevalently internal modes left over by the first coupling operated by the first coupler, and the transfer of the internal modes into the active fiber is inefficient.

EP patent application No 97114622.0 in the name of the Applicant proposes a technique to improve the total coupling efficiency in the above two couplers pumping schemes. The improvement is obtained by interposing, along the pump fiber connection coupling the first and the second coupler, a mode scrambler, i.e. a device that operates a scrambling of the inner modes on the residual pump radiation so as to regenerate a high number of external modes that can be efficiently transferred into the active fiber through the second coupler. Under ideal circumstances, 50% of the pump power signal enters the active fiber at each of the couplers. This would lead to a total coupling efficiency for the coupling system of 75%. In practice, however, the total coupling efficiency is close to 68%.

EP patent application No. 97114620.4 in the name of the Applicant proposes a different solution for the same problem, consisting in the use of two unequal couplers manufactured by a fusion biconical tapering technique. In practice, the first and the second couplers have different fusing and tapering amounts with the active fiber so as to achieve a better coupling efficiency. This further pumping solution allows a total coupling efficiency of approximately 66%.

It is an object of the present invention is to provide a pump device that is adapted to couple pump radiation to the active fiber (or active fibers) with a better coupling efficiency with respect to the known optical amplifiers.

The Applicant has found that a very high coupling efficiency can be achieved by providing a first coupler with a very low insertion loss for the signals (even if it has a very low pump coupling efficiency) and a coupler having a high pump coupling efficiency (even if it has a relatively high insertion loss).

In particular, the Applicant has found that a very high coupling efficiency can be obtained by means of a double-coupler arrangement in which a first coupler, adapted to receive a pump radiation from a pump source and to couple it to the active fiber, has an insertion loss for optical signals not greater than 0,2 dB, and a second coupler, adapted to receive a residual fraction of the pump radiation from the first coupler and to couple it to the active fiber, has a coupling efficiency for the pump radiation not less than 70%.

The couplers can feed the opposite ends of a single active fiber section (in which case the second coupler counter-pumps the fiber) or can feed two separate sections of active fiber. In this case the second coupler preferably pumps the second section of fiber in a co-propagating direction, while the first coupler can pump in either direction the first section.

The Applicant has in particular found that a double-coupler arrangement in which said first coupler is a fused fiber coupler and said second coupler is a micro optic coupler can provide a total coupling efficiency up to 85%, much higher than the maximum coupling efficiencies achievable with known arrangements.

According to a first aspect, the present invention relates to a pump device for coupling a pump radiation into an active fiber of an optical amplifier, said optical amplifier being adapted to amplify optical signals, said pump device including a multi-mode optical fiber to receive and convey a multi-mode pump radiation, a first optical coupler for optically coupling a first fraction of said pump radiation to said active fiber, a second optical coupler that is optically coupled to said first coupler to receive from said first coupler a second fraction of said pump radiation and that is further optically coupled to said active fiber to feed to said active fiber at least part of the second fraction of said pump radiation, characterized in that said first optical coupler has an insertion loss for said optical signals less than or equal to 0.2 dB and said second optical coupler has a coupling efficiency for said pump radiation of at least 70%.

Preferably, said first optical coupler is a fused fiber coupler and said second optical coupler is a micro optic coupler.

Preferably, the sum of the optical power of the first fraction of said pump radiation and of the optical power of said at least part of the second fraction of said pump radiation is more than 75% of the total optical power of said pump radiation. More preferably, said sum is at least 85% of the total optical power of said pump radiation.

Preferably, the pump device further comprises a pump optical fiber optically coupling said second optical coupler to said first optical coupler; said pump optical fiber being a multi-modal optical fiber adapted to transmit optical radiation without substantial energy transfer between modes.

Preferably, said first optical coupler has a first access fiber; a second access fiber that is a multi-modal fiber and is optically coupled to said multi-mode optical fiber to receive said pump radiation; a third access fiber that is of the same type of said first access fiber adapted to be coupled to said active fiber to feed to said active fiber the first fraction of said pump radiation; and a fourth access fiber, of the same type of said second access fiber, into which said second fraction of said pump radiation is conveyed; and said second coupler has a first access fiber that is a multi-modal fiber optically coupled to said fourth access fiber of said first optical coupler to receive the second fraction of said pump radiation; a second access fiber that is a double-cladding fiber adapted to be coupled to said second active fiber to feed to said second active fiber said at least part of the second fraction of said pump radiation, and a third access fiber for conveying said optical signals.

Preferably, said first access fiber of said first coupler is a single-mode fiber adapted to be coupled to an optical input to receive said optical signals and said third access fiber of said second coupler is a single-mode fiber adapted to be coupled to an optical output to feed to said optical output said optical signals.

According to a second aspect, the invention relates to an optical amplifier including an optical input for the input of optical signals, an optical output for the output of said optical signal, an active fiber interposed between said input and said output and adapted to amplify said optical signals, a pump source for generating a pump radiation and a pumping device according to the above to optically couple said pump radiation to said active fiber.

Preferably, said active fiber is a double-cladding fiber.

Preferably, said active fiber comprises two fiber sections, each coupled to a respective one of the two couplers.

According to another aspect, the invention relates to an optical amplifying unit including two optical amplifiers according to the above arranged in series.

Preferably, said optical amplifying unit further includes a pre-amplifier arranged in series with said optical amplifiers.

Preferably, said optical amplifying unit further includes at least one noise rejection filter arranged in series with said optical amplifiers.

According to another aspect, the invention relates to an optical transmission system including an optical transmitting unit adapted to transmit an optical signal, an optical receiving unit to receive said optical signal, an optical fiber link optically coupling said transmitting unit to said receiving unit, characterized in that it further includes an active fiber positioned along said optical fiber link to amplify said optical signal, a pump source to generate pump radiation and a pump device according to the above to couple said pump radiation to said active fiber.

According to a further aspect, the invention relates to a method for coupling a pump radiation into an active fiber adapted to amplify optical signals, comprising the following steps:
guiding an optical signal;
guiding a multimode pump radiation;
inputting said optical signal and said pump radiation to said active fiber; said optical signal being input with a predetermined insertion loss and said pump radiation being input so as to feed a first power fraction to said active fiber and to obtain a residual power fraction;
inputting said residual power fraction to said active fiber with a predetermined coupling efficiency so as to feed a second power fraction to said active fiber;
characterized in that said insertion loss is lower than or equal to 0.2 dB and said coupling efficiency is at least 70%. Preferably, the sum of said first and second power fractions is more than 75%, and more preferably at least 85%, of the optical power of said pump radiation.

The foregoing general description and the following detailed description are exemplary and explanatory only and are not restrictive of the invention as claimed. The following description, as well as the practice of the invention, set forth and suggest additional advantages and purposes of this invention.

The accompanying drawings, which are incorporated in and constitute a part of this specification, illustrate embodiments of the invention, and together with the description, explain the advantages and principles of the invention.

Figure 1:
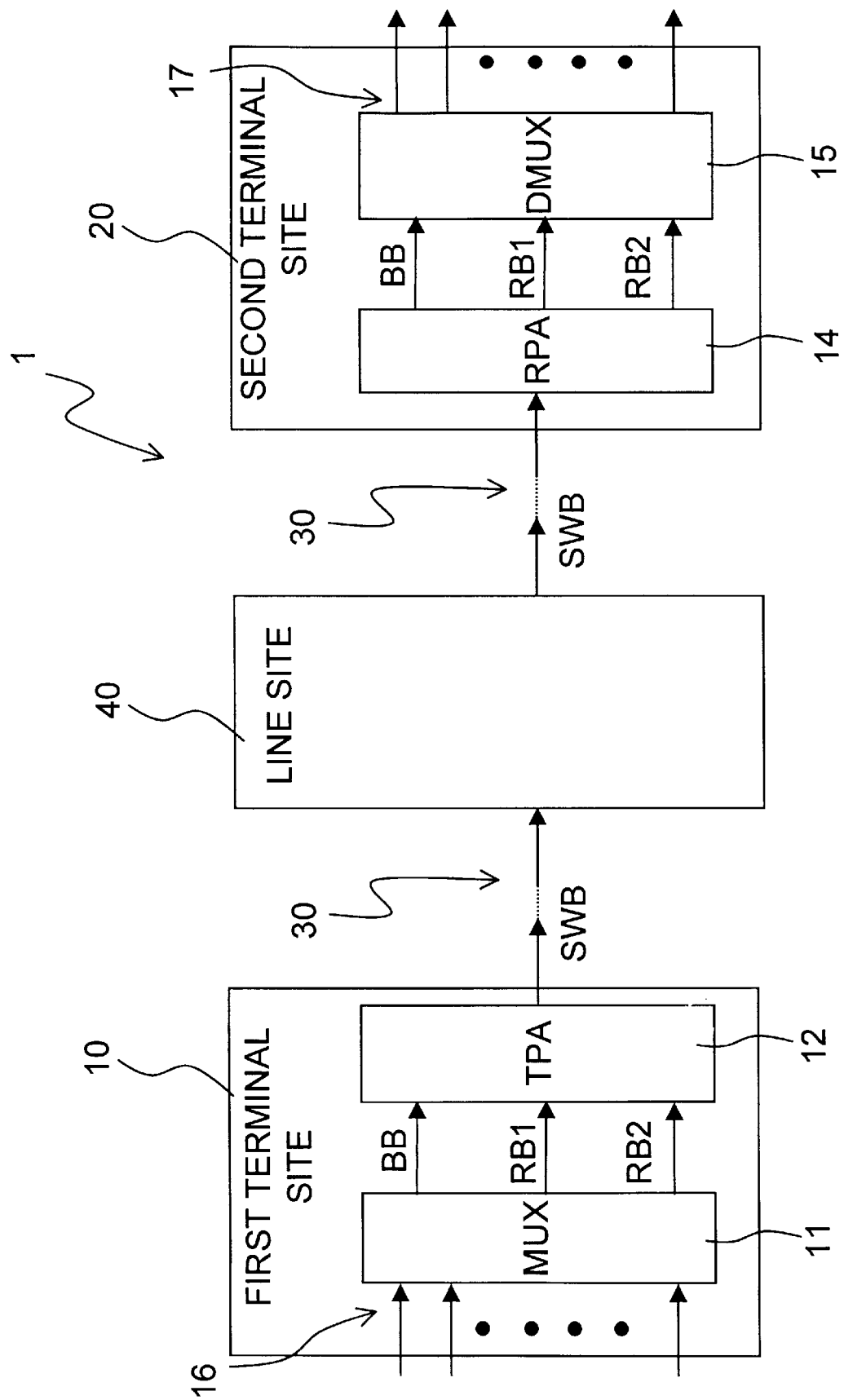
FIG. 1 is a block diagram of an optical transmission system consistent with the present invention.

Referring to FIG. 1, an optical transmission system 1 includes a first terminal site 10, a second terminal site 20, an optical fiber line 30 connecting the two terminal sites 10, 20, and at least one line site 40 interposed between the terminal sites 10 and 20 along the optical fiber line 30.

For simplicity, the optical transmission system 1 hereinafter described is unidirectional, that is signals travel from a terminal site to the other (in the present case from the first terminal site to the second terminal site), but any consideration that follow is to be considered valid also for bi-directional systems, in which signals travel in both directions. Further, although the optical transmission system 1 is adapted to transmit up to one-hundred-twenty-eight (128) channels, from the hereinafter description it will be obvious that the number of channels is not a limiting feature for the scope and the spirit of the invention, and more than one-hundred-twenty-eight (128) channels can be used depending on the needs and requirements of the particular optical transmission system.

The first terminal site 10 preferably includes a multiplexing section (MUX) 11, a transmitter power amplifier section (TPA) 12 and a plurality of input channels 16. The second terminal site 20 preferably includes a receiver pre-amplifier (RPA) section 14, a demultiplexing section (DMUX) 15 and a plurality of output channels 17.

Each input channel 16 is received by multiplexing section 11. Multiplexing section 11, hereinafter described with reference to FIG. 3, multiplexes or groups input channels 16 preferably into three sub-bands, referred to as blue-band BB, first red-band RB1 and second red-band RB2, although multiplexing section 11 could alternatively group input channels 16 into a number of sub-bands greater or less than three.

The three sub-bands BB, RB1 and RB2 are then received, as separate sub-bands or as a combined wide-band, in succession by TPA section 12, at least one line site 40 and second terminal site 20. Sections of optical fiber line 30 adjoin the at least one line site 40 with TPA section 12, RPA section 14, and possibly with others line sites 40 (not shown). TPA section 12, that will be later described with reference to FIG. 4, receives the separate sub-bands BB, RB1 and RB2 from multiplexing section 11, amplifies and optimizes them, and then combines them into a single wide-band SWB for transmission on a first section of optical fiber line 30. Line site 40, that will be later described with reference to FIG. 6, receives the single wide-band SWB, re-divides the single wideband SWB into the three sub-bands BB, RB1 and RB2, eventually adds and drops signals in each sub-band BB, RB1 and RB2, amplifies and optimizes the three sub-bands BB, RB1 and RB2 and then recombines them into the single wide-band SWB. For the adding and dropping operations, line site 40 may be provided with Optical Add/Drop Multiplexers (OADM) of a known type or, for example, of the type described in EP patent application No. 98110594.3 in the name of the Applicant.

A second section of optical fiber line 30 couples the output of the line site 40 to either another line site 40 (not shown) or to RPA section 14 of second terminal site 20. RPA section 14, that will be later described with reference to FIG. 7, also amplifies and optimizes the single wide-band SWB and may split the single wide-band SWB into the three sub-bands BB, RB1 and RB2 before outputting them.

Figure 8:
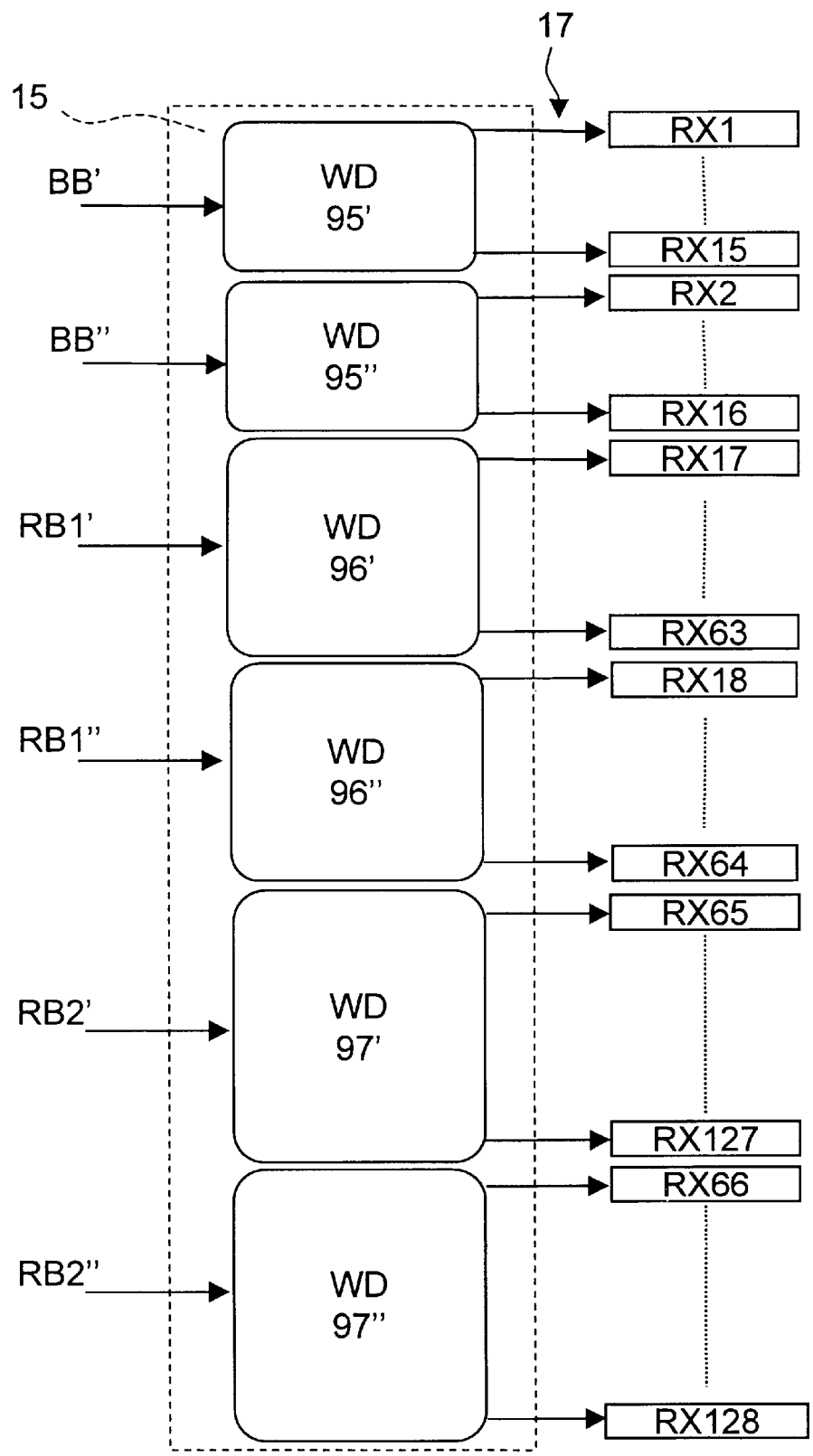
FIG. 8 is a detailed diagram of a multiplexing section of the optical transmission system of FIG. 1.

Demultiplexing section 15, that will be later described with reference to FIG. 8, receives the three sub-bands BB, RB1 and RB2 from RPA section 14 and splits the three sub-bands BB, RB1 and RB2 into the individual wavelengths of output channels 17. The number of input channels 16 and output channels 17 may be unequal, owing to the fact that some channels can be dropped and/or added in line site (or line sites) 40.

According to the above, for each sub-band BB, RB1 and RB2 an optical link is defined between the corresponding input of TPA section 12 and the corresponding output of RPA section 14.

Figure 2:
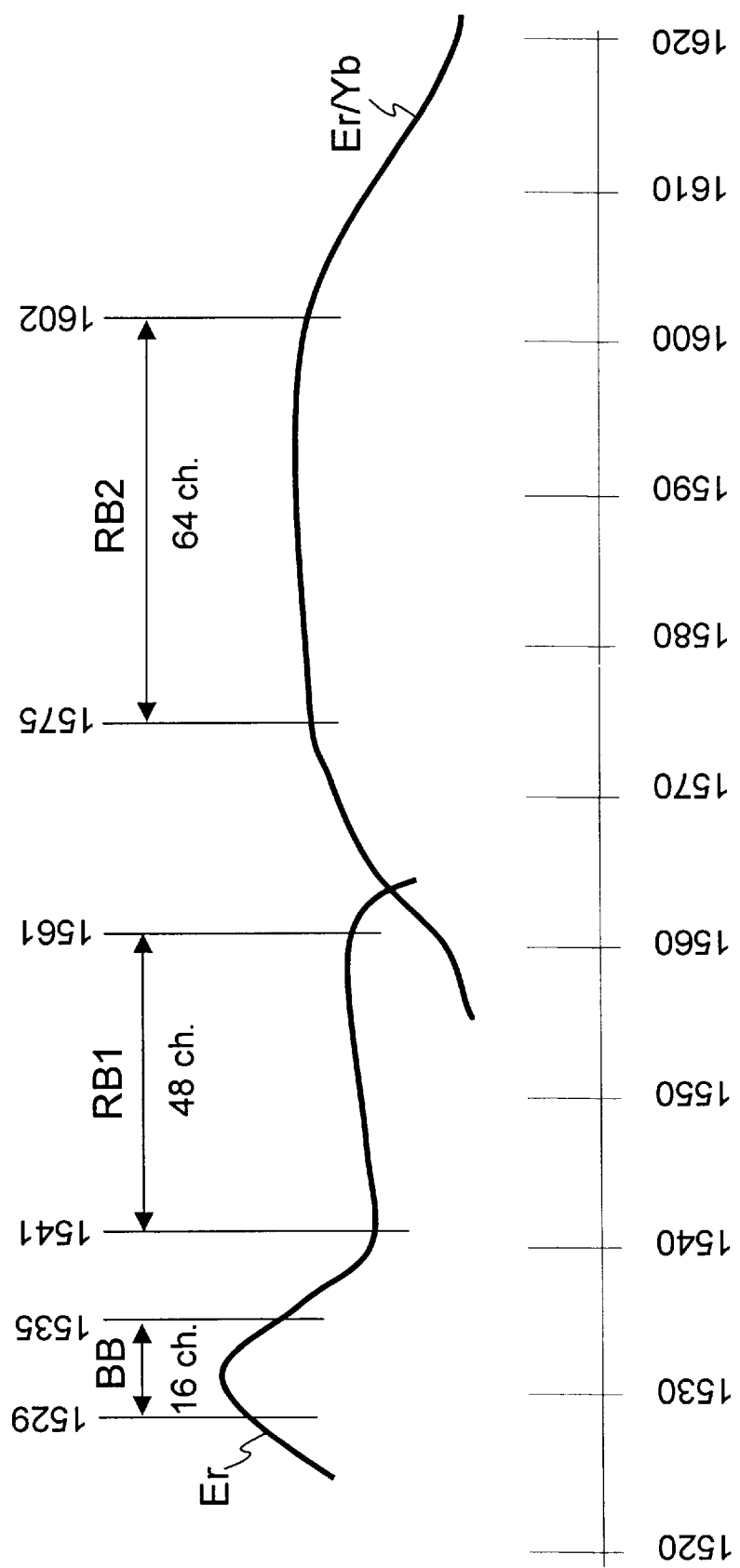
FIG. 2 is a qualitative graph of the spectral gain characteristic of the optical transmission system of FIG. 1, with a designation of the signal transmission bands (BB, RB1 and RB2)

FIG. 2 is a qualitative graph of the spectral emission ranges of the amplifiers used in the optical transmission system 1 and approximately corresponding to the different gain for channels of signals traveling through the fiber link and the different allocation of the three subbands BB, RB1 and RB2. In particular, the first sub-band BB preferably covers the range between 1529 nm and 1535 nm, corresponds to a first amplification wavelength range of erbium-doped fiber amplifiers and allocates up to sixteen (16) channels; the second sub-band RB1 fall between 1541 nm and 1561 nm, corresponds to a second amplification wavelength range of erbium-doped fiber amplifiers and allocates up to forty-eight (48) channels; and the third sub-band RB2 covers the range between 1575 nm and 1602 nm, corresponds, according to the invention, to an amplification wavelength range of erbiumlytterbium-doped fiber amplifiers and allocates up to sixty-four (64) channels. The gain spectral graph of the erbium/ytterbium-doped fiber amplifiers is such that, although the 1575–1602 nm range offers the best performances in terms of amplification, channels can be advantageously allocated down to 1565 nm and up to 1620 nm. More in details, the Applicant has observed that a lower limit 1570 nm is preferred for the allocation of channels in the RB2 band, due to the shape of the power spectrum curve of Er/Yb co-doped fibers in this wavelength range.

Adjacent channels, in the proposed one-hundred-twenty-eight (128) channel system, have a 50 GHz constant spacing. Alternatively, the frequency spacing may be unequal to alleviate the known four-wave-mixing phenomenon.

In the erbium amplification band, the RB1 and RB2 bands have a fairly flat gain characteristic, while the BB band includes a substantial hump in the gain response. As explained below, to make use of the erbium-doped fiber spectral emission range in the BB band, optical transmission system 1 uses equalizing means to flatten the gain characteristic in that range. As a result, by dividing the erbium-doped fiber spectral emission range of 1529–1602 nm into three sub-ranges that respectively include the BB band, RB1 band and RB2 band, optical transmission system 1 can effectively use most of the erbium-doped fiber spectral emission range and provide for dense WDM.

The following provides a more detailed description of the various modules of the present invention depicted in FIG. 1.

Figure 3:
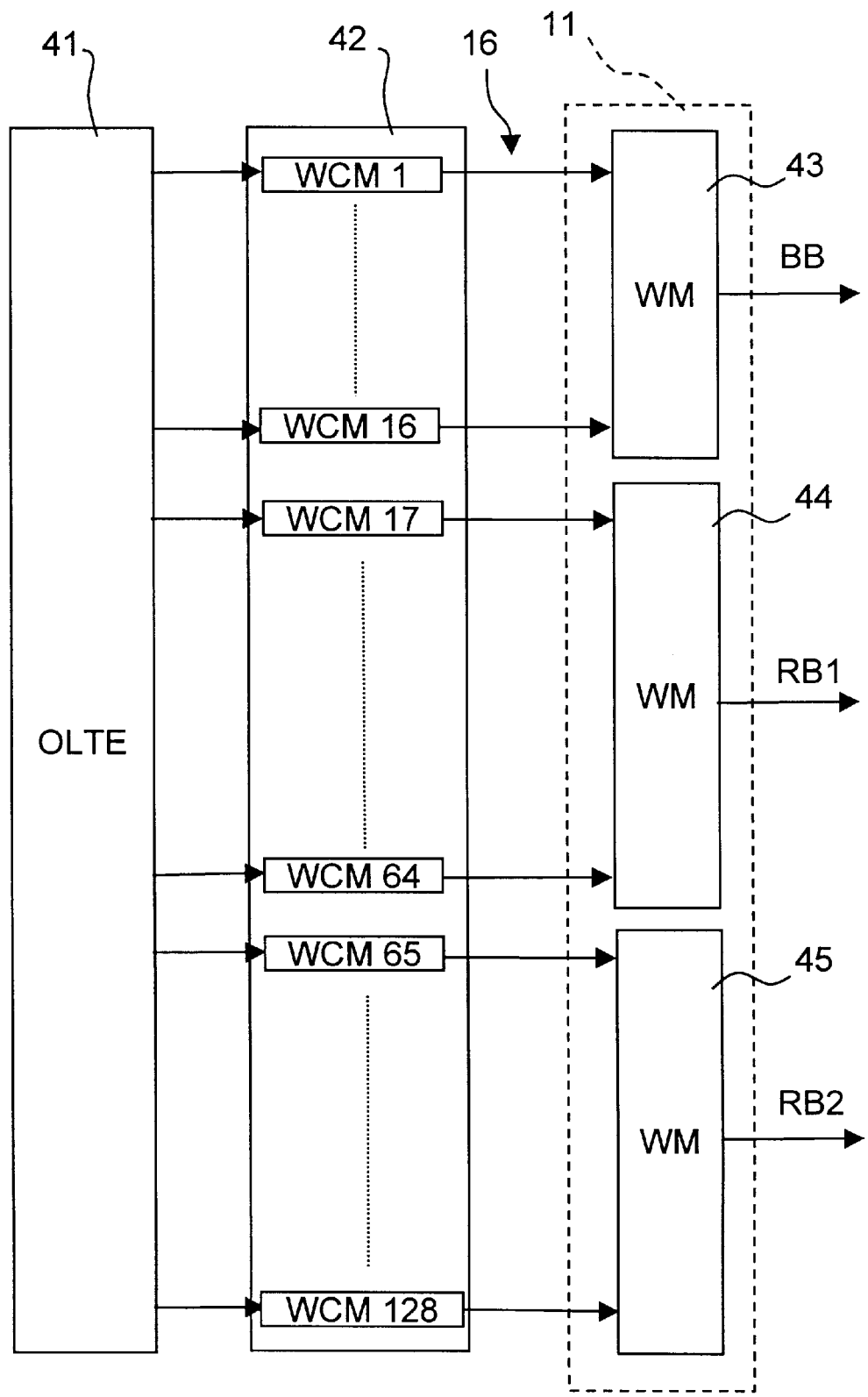
FIG. 3 is a more detailed diagram of the multiplexing section of the optical transmission system in FIG. 1.

FIG. 3 shows a more detailed diagram of the multiplexing section 11 of first terminal site 10. The first terminal site 10 includes, in addition to the multiplexing section 11 and the TPA section 12 (not shown in FIG. 3), an optical line terminal section (OLTE) 41 and a wavelength converter section (WCS) 42.

OLTE 41, which may correspond to standard line terminating equipment for use in a SONET, ATM, IP or SDH system, includes transmit/receive (TX/RX) units (not shown) in a quantity that equals the number of channels in WDM systems 10. In a preferred embodiment, OLTE 41 has one-hundred-twenty-eight (128) TX/RX units. In multiplexing section 11, OLTE 41 transmits a plurality of signals at a generic wavelength. As shown in FIG. 3, in a preferred embodiment OLTE 41 outputs a first group of sixteen (16) channels, a second group of forty-eight (48) channels and a third group of sixty-four (64) channels. However, as indicated above, the number of channels may vary depending on the needs and requirements of the particular optical transmission system.

As readily understood to one of ordinary skill in the art, OLTE 41 may comprise a collection of smaller separate OLTEs, such as three, that feed information frequencies to WCS 42. Accordingly, WCS 42 includes one-hundred-twenty-eight (128) wavelength converter modules WCM1–WCM128.

Units WCM1–WCM16 each receive a respective one of the first group of signals emitted from OLTE 41, units WCM17–WCM64 each receive one of the second group of signals emitted from OLTE 41 and units WCM65–WCM128 each receive one of the third group of signals emitted from OLTE 41. Each unit is able to convert a signal from a generic wavelength to a selected wavelength and re-transmit the signal. The units may receive and retransmit a signal in a standard format, such as OC-48 or STM-16, but the preferred operation of WCM1–128 is transparent to the particular data format employed.

Each WCM1–128 preferably comprises a module having a photodiode (not shown) for receiving an optical signal from OLTE 41 and converting it to an electrical signal, a laser or optical source (not shown) for generating a fixed carrier wavelength, and an electro-optic modulator such as a Mach-Zehnder modulator (not shown) for externally modulating the fixed carrier wavelength with the electrical signal. Alternatively, each WCM1–128 may comprise a photodiode (not shown) together with a laser diode (not shown) that is directly modulated with the electrical signal to convert the received wavelength to the carrier wavelength of the laser diode. As a further alternative, each WCM1–128 comprises a module having a high sensitivity receiver (e.g., according to SDH or SONET standards) for receiving an optical signal, e.g., via a wavelength demultiplexer, from a trunk fiber line end and converting it to an electrical signal, and a direct modulation or external modulation laser source. By the latter alternative, regeneration of signals from the output of a trunk fiber line and transmission in the inventive optical communication system is made possible, which allows extending the total link length.

Although FIG. 3 shows that the signals are provided and generated by the combination of OLTE 41 and WCM1–WCM128, the signals can also be directly provided and generated by a source without limitation to their origin.

The multiplexing section 11 includes three wavelength multiplexers (WM) 43, 44 and 45. For the preferred one-hundred-twenty-eight (128) channels system, each selected wavelength signal output from units WCM1–WCM16 is received by WM 43, each selected wavelength signal output from WCM17–WCM64 is received by WM 44 and each selected wavelength signal output from WCM 65–WCM128 is received by WM 45. WM 43, WM 44 and WM 45 combine the received signals of the three bands BB, RB1 and RB2 into three respective wavelength division multiplexed signals. As shown in FIG. 3, WM 43 is a sixteen (16) channels wavelength multiplexer, such as a conventional 1×16 planar optical splitter, WM 44 is a forty-eight (48) channels wavelength multiplexer, such as a conventional 1×64 planar optical splitter with sixteen (16) unused ports and WM 45 is a sixty-four (64) channels wavelength multiplexer, such as a conventional 1×64 planar optical splitter. Each wavelength multiplexer may include a second port (e.g. 2×16 and 2×64 splitters) for providing optical transmission system 1 with an optical monitoring channel (not shown). As well, WM 43, 44 and 45 may have more inputs than is used by the system to provide space for system growth. A wavelength multiplexer using passive silica-on-silicon ($SiO_2$—Si) or silica-on-silica ($SiO_2$—$SiO_2$) technology, for instance, can be made by one of ordinary skill in the art. Other technologies can also be used for WMs, e.g., for reducing insertion losses. Examples are AWG (Arrayed Waveguide Gratings), fiber gratings, and interferential filters.

Figure 4:
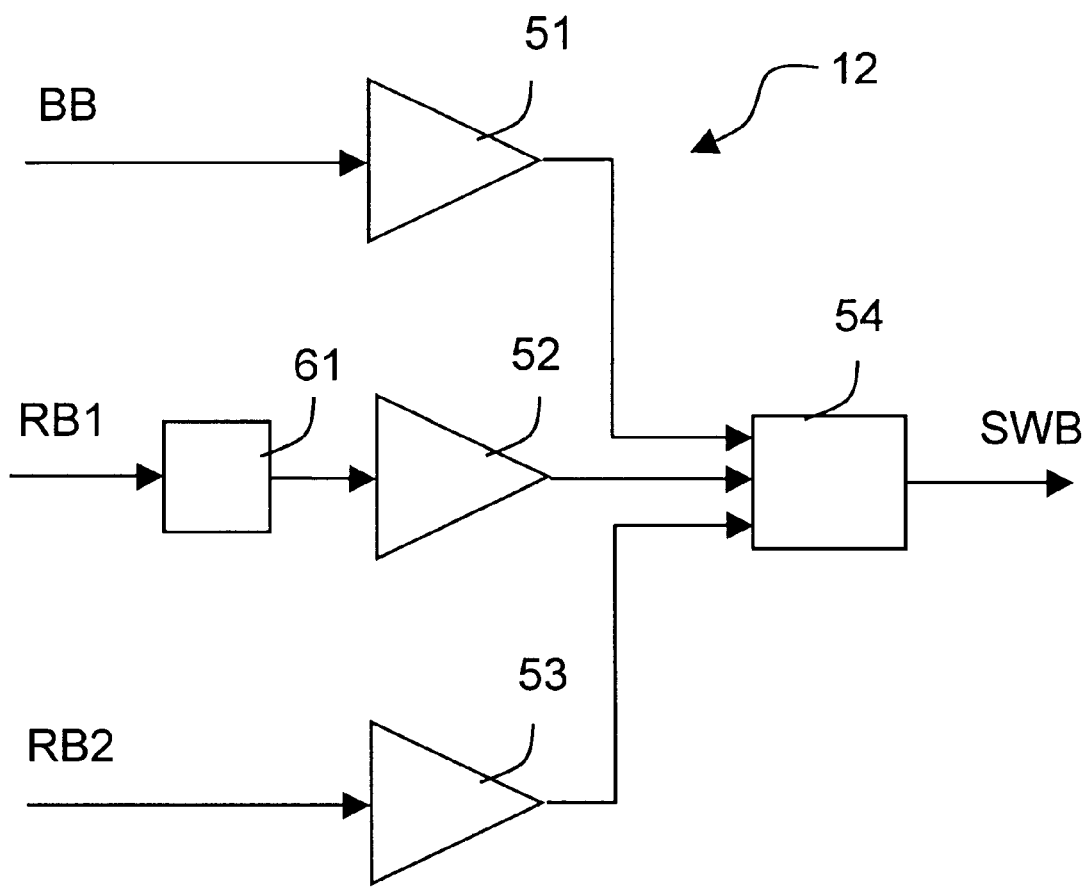
FIG. 4 is a more detailed diagram of the transmitter power amplifier section of the optical transmission system in FIG. 1.

With reference to FIG. 4, the BB, RB1 and RB2 band output from multiplexing section 11 are received by TPA section 12. The BB, RB1 and RB2 band signals may be provided to TPA section 12 from a source other than the OLTE 41, WCS 42, and WM 43, 44 and 45 configuration depicted in FIG. 3. For example, the BB, RB1 and RB2 band signals may be generated and directly supplied to TPA section 12 by a customer without departing from the intent of the present invention described in more detail below.

TPA section 12 includes three amplifier sections 51, 52, 53, each for a respective band BB, RB1 and RB2, a coupling filter 54 and an equalizing filter 61. Amplifier sections 51, 52 are preferably erbium-doped two-stages fiber amplifiers (although other rare-earth-doped fiber amplifiers may be used), while amplifier section 53 is, according to the invention, an erbium/ytterbium-doped (Er/Yb) fiber amplifier that will be described in details with reference to FIG. 10.

The outputs of amplifiers 51, 52 and 53 are received by filter 54, which combines the BB, RB1 and RB2 bands into a single wide-band (SWB).

Each of the amplifiers 51 and 52 is pumped by one or two laser diodes to provide optical gain to the signals it amplifies. The characteristics of each amplifier, including its length and pump wavelength, are selected to optimize the performance of that amplifier for the particular sub-band that it amplifies. For example, the first stage of amplifier sections 51 and 52 may be pumped with a laser diode (not shown) operating at 980 nm to amplify the BB band and the RB1 band, respectively, in a linear or in a saturated regime. Appropriate laser diodes are available from the Applicant. The laser diodes may be coupled to the optical path of the pre-amplifiers using 980/1550 WDM couplers (not shown) commonly available on the market, for example model SWDM0915SPR from E-TEK DYNAMICS, INC., 1885 Lundy Ave., San Jose, Calif. (USA). The 980 nm laser diode provides a low noise figure for the amplifiers compared with other possible pump wavelengths.

The second stage of each amplifier section 51–53 preferably operates in a saturated condition. The second stage of amplifier section 51 is preferably erbium-doped and amplifies the BB band with another 980 nm pump (not shown) coupled to the optical path of the BB band using a WDM coupler (not shown) described above. The 980 nm pump provides better gain behavior and noise figure for signals in the low band region that covers 1529–35 nm. The second stage of amplifier section 52 is preferably erbium-doped and amplifies the RB1 band with a laser diode pump source operating at 1480 nm. Such a laser diode is available on the market, such as model FOL1402PAX-1 supplied by JDS FITEL, INC., 570 Heston Drive, Nepean, Ontario (Calif.). The 1480 nm pump provides better saturated conversion efficiency behavior, which is needed in the RB1 band for the greater number of channels in the region that covers 1542–61 nm. Alternatively, a higher power 980 nm pump laser or multiplexed 980 nm pump sources may be used. Section 53 will be hereunder described in details with reference to FIG. 10.

Figure 5:
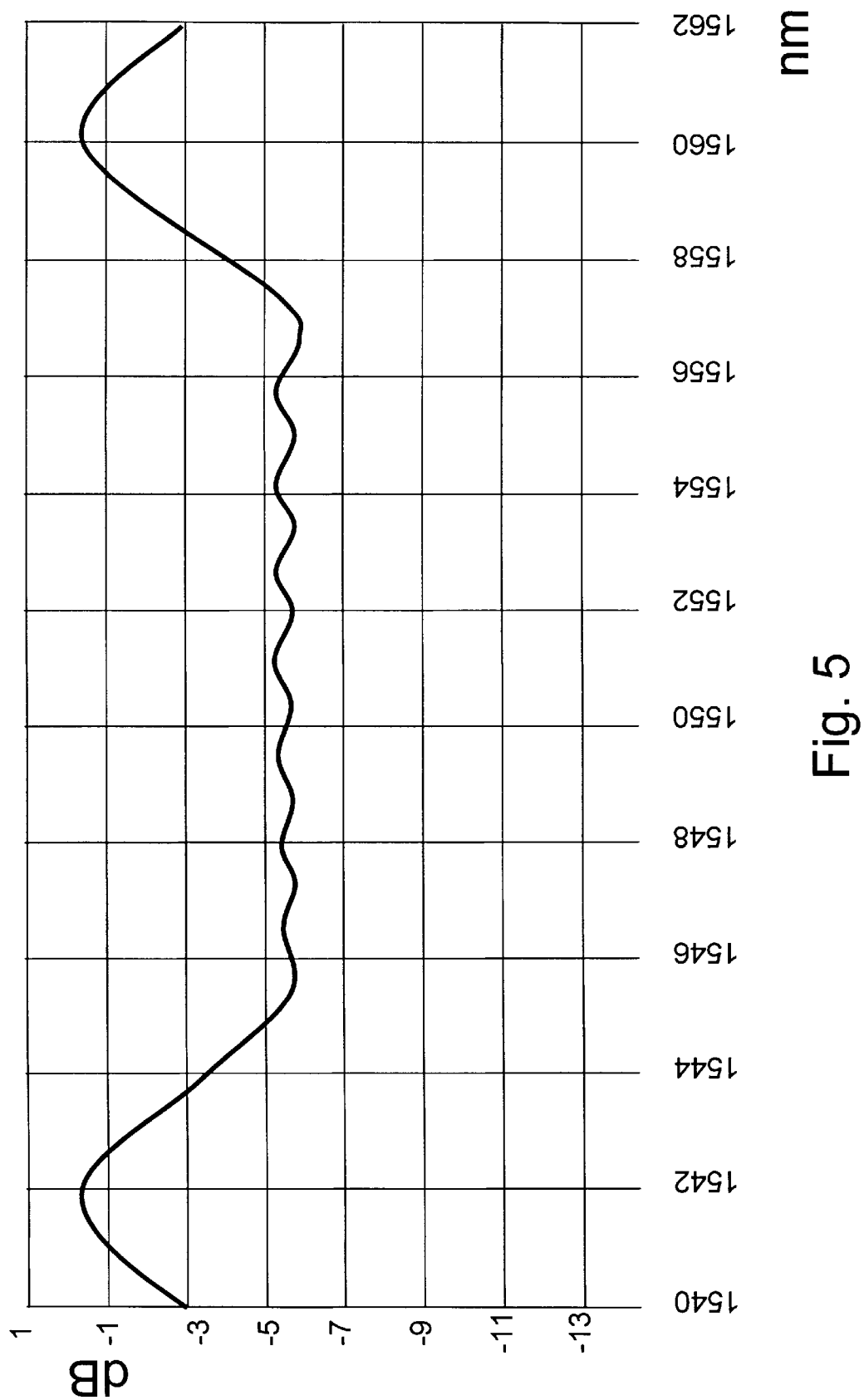
FIG. 5 is a graph of a filter performance shape of a de-emphasis filter for the optical transmission system of FIG. 1.

Filter 61 is positioned within the RB1 band amplifier chain for helping to equalize signal levels and SNRs at the system output across the RB1 band. In particular, filter 61 comprises a de-emphasis filter that attenuates the wavelength regions of the high amplification within the RB1 band. The de-emphasis filter, if used, may employ long period Bragg grating technology, split-beam Fourier filter, etc.. As an example, the de-emphasis filter may have an operating wavelength range of 1541–1561 nm and have wavelengths of peak transmission at 1541–1542 nm and 1559–1560 nm, with a lower, relatively constant transmission for the wavelengths between these peaks. FIG. 5 illustrates the filter shape or relative attenuation performance of a preferred de-emphasis filter 61. The graph of FIG. 5 shows that the de-emphasis filter 61 has regions of peak transmission at around 1542 nm and 1560 nm, and a region of relatively constant or flat attenuation between about 1546 nm and 1556 nm. The de-emphasis filter 61 for erbium-doped fiber amplifiers need only add an attenuation of about 3–4 dB at wavelengths between the peaks to help flatten the gain response across the high band. The de-emphasis filter 61 may have an attenuation characteristic different from that depicted in FIG. 5 depending on the gain-flattening requirements of the actual system employed, such as the dopant used in the fiber amplifiers or the wavelength of the pump source for those amplifiers.

Alternatively, the de-emphasis filter 61 may be omitted and the de-emphasis operation may be obtained in the multiplexing section 11 of the first terminal site 10 by means of calibrated attenuation.

After passing through the amplifiers of TPA 12, the amplified BB, RB1 and RB2 bands output from amplifier sections 51, 52 and 53, respectively, are received by filter 54. Filter 54 is a band combining filter and may, for example, include two cascaded interferential three port filter (not shown), the first coupling the BB band with the RB1 band and the second coupling the BB/RB1 bands provided by the first filter with the RB2 band.

An optical monitor (not shown) and insertion for a service line, at a wavelength different from the communication channels, e.g. at 1480 nm, through a WDM 1480/1550 interferential filter (not shown) may also be added at the common port. The optical monitor detects optical signals to ensure that there is no break in optical transmission system 1. The service line insertion provides access for a line service module, which can manage through an optical supervisory channel the telemetry of alarms, surveillance, monitoring of performance and data, controls and housekeeping alarms, and voice frequency orderwire.

Figure 6:
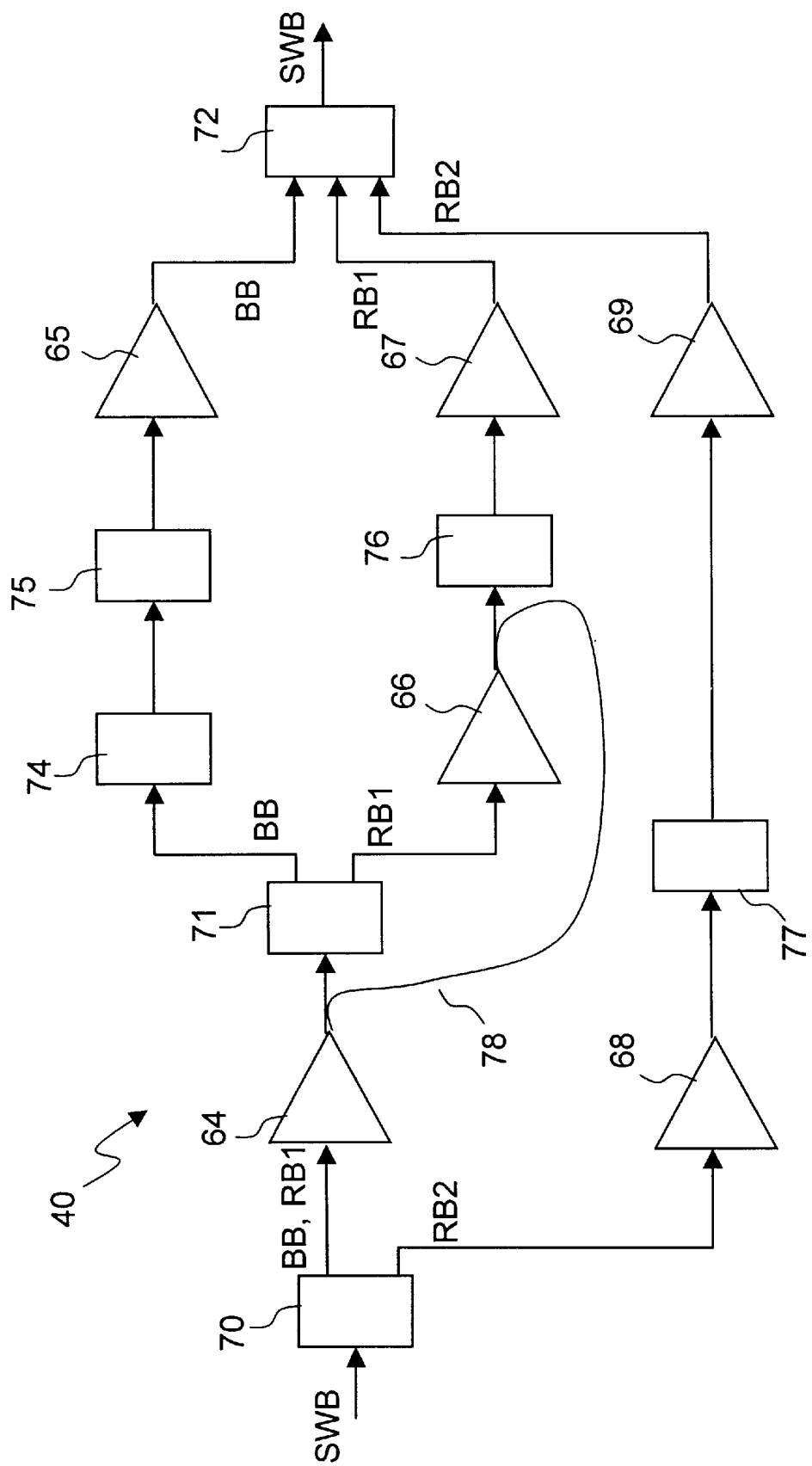
FIG. 6 is a detailed diagram of an intermediate station of the optical transmission system of FIG. 1.

The single wide-band output from filter 54 of TPA section 12 passes through a length of transmission fiber (not shown) of optical fiber line 30 such as 100 kilometers, which attenuates the signals within the single wide-band SWB. Consequently, line site 40 receives and amplifies the signals within the single wide-band SWB. As shown in FIG. 6, line site 40 includes several amplifiers (AMP) 64–69, three filters 70–72, an equalizing filter (EQ) 74 and three OADM stages 75–77.

Filter 70 receives the single wide-band SWB and separates the RB2 band from the BB and the RB1 bands. Amplifier 64 receives and amplifies the BB and the RB1 bands, whereas filter 71 receives the output from amplifier 64 and separates the BB band and the RB1 band. The BB band is equalized by equalizing filter 74, received by the first OADM stage 75 where predetermined signals are dropped and/or added, and further amplified by amplifier 65. The RB1 band, which has already passed through de-emphasis filter 61. in TPA 12, is first amplified by amplifiers 66, then received by the second OADM stage 76 where predetermined signals are dropped and/or added, and further amplified by amplifier 67. The RB2 band is first amplified by amplifiers 68, then received by the third OADM stage 77 where predetermined signals are dropped and/or added, and further amplified by amplifier 69. The amplified BB, RB1 and RB2 bands are then recombined into the single wide-band SWB by filter 72.

Amplifier 64, which receives the single wide-band SWB, preferably comprises a single optical fiber amplifier that is operated in a linear regime. That is, amplifier 64 is operated in a condition where its output power is dependent on its input power. Depending on the actual implementation, amplifier 64 may alternatively be a single-stage or a multi-stage amplifier. By operating it in a linear condition, amplifier 64 helps to ensure relative power independence between the BB and RB1 band channels. In other words, with amplifier 64 operating in a linear condition, the output power (and signal-to-noise ratio) of individual channels in the one of the two sub-bands BB, RB1 does not vary significantly if channels in the other sub-band RB1, BB are added or removed. To obtain robustness with respect to the presence of some or all of the channels in a dense WDM system, first stage amplifier (such as amplifier 64 and amplifier 68) must be operated, in a line site 40, in an unsaturated regime, before extracting a portion of the channels for separate equalization and amplification. In a preferred embodiment, amplifiers 64 and 68 are erbium-doped fiber amplifiers, pumped in a co-propagating direction with a laser diode (not shown) operating at 980 nm pump to obtain a noise figure preferably less than 5.5 dB for each band.

Filter 71 may comprise, for example, a three-port device, preferably an interferential filter, having a drop port that feeds the BB band into equalizing filter 74 and a reflection port that feeds the RB1 band into amplifier 66.

Amplifier 66 is preferably a single erbium-doped fiber amplifier that is operated in saturation, such that its output power is substantially independent from its input power. In this way, amplifier 66 serves to add a power boost to the channels in the RB1 band compared with the channels in the BB band. Due to the greater number of channels in the RB1 band compared with the BB band in the preferred embodiment, i.e. forty-eight (48) channels as opposed to sixteen (16), the RB1 band channels typically will have had a lower gain when passing through amplifier 64. As a result, amplifier 66 helps to balance the power for the channels in the RB1 band compared with the BB band. Of course, for other arrangements of channels between the BB and the RB1 bands, amplifier 66 may not be required or may alternatively be required on the BB band side of line site 40.

With respect to the RB1 band of channels, amplifiers 64 and 66 may be viewed together as a two-stage amplifier with the first stage operated in a linear mode and the second stage operated in saturation. To help stabilize the output power between channels in the RB1 band, amplifier 64 and 66 are preferably pumped with the same laser diode pump source. In this manner, as described in EP 695049, the residual pump power from amplifier 64 is provided to amplifier 66. Specifically, line site 40 includes a WDM coupler positioned between amplifier 64 and filter 71 that extracts 980 nm pump light that remains at the output of amplifier 64. This WDM coupler may be, for example, model number SWDMCPR3PS110 supplied by E-TEK DYNAMICS, INC., 1885 Lundy Ave., San Jose, Calif. (USA). The output from this WDM coupler feeds into a second WDM coupler (not shown) of the same type and positioned in the optical path after amplifier 66. The two couplers are joined by an optical fiber 78 that transmits the residual 980 nm pump signal with relatively low loss. The second WDM coupler passes the residual 980 nm pump power into amplifier 66 in a counter-propagating direction.

From amplifier 66, RB1 band signals are conveyed to OADM stage 76 of a known type or of the type described in EP patent application No. 98110594.3 in the name of the Applicant. From OADM stage 76, RB1 band signals are fed to amplifier 67. For the preferred erbium-doped fiber amplifier, amplifier 67 has a pump wavelength of, for example, 1480 nm from a laser diode source (not shown) having a pump power in excess of the laser (not shown) that drives amplifiers 64 and 66. The 1480 nm wavelength provides good conversion efficiency for high output power output compared with other pump wavelengths for erbium-doped fibers. Alternatively, a high power 980 nm pump source or a group of multiplexed pump sources, such as two pump sources at 980 nm, or one at 975 nm and another at 986 nm, could be used to drive amplifier 67. Amplifier 67 preferably operates in saturation to provide the power boost to the signals within the RB1 band, and if desired, may comprise a multi-stage amplifier.

After passing through amplifier 64 and filter 71, the BB band enters equalizing filter 74. As discussed above, the gain characteristic for the erbium-doped fiber spectral emission range has a peak or hump in the BB band region, but remains fairly flat in the RB1 band region. As a result, when the BB band or the single wide-band SWB (which includes the BB band) is amplified by an erbium-doped fiber amplifier, the channels in the BB band region are amplified unequally. Also, as discussed above, when equalizing means have been applied to overcome this problem of unequal amplification, the equalizing has been applied across the entire spectrum of channels, resulting in continued gain disparities. However, by splitting the spectrum of channels into a BB band and a RB1 band, equalization in the reduced operating area of the BB band can provide proper flattening of the gain characteristic for the channels of the BB band.

In a preferred embodiment, the equalizing filter 74 comprises a two-port device based on long period chirped Bragg grating technology that gives selected attenuation at different wavelengths. For instance, equalizing filter 74 for the BB band may have an operating wavelength range of 1529 nm to 1536 nm, with a wavelength at the bottom of the valley at between 1530.3 nm and 1530.7 nm. Equalizing filter 74 need not be used alone and may be combined in cascade with other filters (not shown) to provide an optimal filter shape, and thus, gain equalization for the particular amplifiers used in the WDM system 1. Equalizing filter 74 may be manufactured by one skilled in the art, or may be obtained from numerous suppliers in the field. It is to be understood that the particular structure used for the equalizing filter 74 is within the realm of the skilled artisan and may include, for instance, a specialized Bragg grating like a long period grating, an interferential filter, or Mach-Zehnder type optical filters.

From equalizing filter 74, BB band signals are conveyed to OADM stage 75, which is, for example, of the same type of OADM stage 76, and then to amplifier 65. With the preferred erbium-doped fiber amplifier, amplifier 65 has a pump wavelength of 980 nm, provided by a laser diode source (not shown) and coupled via a WDM coupler (not shown) to the optical path for pumping the amplifier 65 in a counter-propagating direction. Since the channels in the BB band pass through both amplifier 64 and amplifier 65, equalizing filter 74 may compensate for the gain disparities caused by both amplifiers: Thus, the decibel drop for equalizing filter 74 should be determined according to the overall amplification and line power requirements for the BB band. The amplifier 65 preferably operates in saturation to provide a power boost to the signals in the BB band, and may comprise a multi-stage amplifier if desired.

The RB2 band is received from fiber amplifier 68, which is, preferably, an erbium doped fiber amplifier pumped with a 980 nm or a 1480 nm pump light, depending on the system requirements. From amplifier 68, RB2 band channels are conveyed to OADM stage 77, which is, for example, of the same type of OADM stages 75 and 76, and then fed to amplifier 69. Amplifier 69 is, according to the invention, an erbium/ytterbium co-doped amplifier adapted to amplify the RB2 band and will be described in details with reference to FIG. 10.

After passing through amplifiers 65, 67 and 69 respectively, the amplified BB, RB1 and RB2 bands are then recombined by filter 72 into the single wide-band SWB. Like filter 54 of FIG. 4, filter 72 may, for example, include two cascaded interferential three port filter (not shown), the first coupling the BB with the RB1 bands and the second coupling the BB and RB1 bands provided by the first filter with the RB2 band.

Like TPA section 12, line site 40 may also include an optical monitor and a service line insertion and extraction (not shown) through, e.g., a WDM 1480/1550 interferential filter (not shown). One or more of these elements may be included at any of the interconnection points of line site 40.

Besides amplifiers 64–69, filters 70–72 and 74, and OADM stages 75–77, line site 40 may also include a dispersion compensating module (DCM) (not shown) for compensating for chromatic dispersion that may arise during transmission of the signals along the long-distance communication link. The DCM (not shown) is preferably comprised of subunits coupled upstream one or more of amplifiers 65, 67, 69 for compensating the dispersion of channels in one or more than one of the BB, RB1, RB2 bands, and may also have several forms. For example, the DCM may have an optical circulator with a first port connected to receive the channels in the three bands BB, RB1 and RB2. A chirped Bragg grating may be attached to a second port of the circulator. The channels will exit the second port and be reflected in the chirped Bragg grating to compensate for chromatic dispersion. The dispersion compensated signals will then exit a next port of the circulator for continued transmission in the WDM system. Other devices besides the chirped Bragg grating, such as a length of dispersion compensating fiber, may be used for compensating the chromatic dispersion. The design and use of the DCM section are not limiting the present invention and the DCM section may be employed or omitted in the WDM system 1 depending on overall requirements for system implementation.

After the line site 40, the combined single wide-band SWB signal passes through a length of long-distance optical transmission fiber of optical fiber line 30. If the distance between the first and the second terminal site 10, 20 is sufficiently long to cause attenuation of the optical signals, i.e. 100 kilometers or more, one or more additional line sites 40 providing amplification may be used. In a practical arrangement, five spans of long-distance transmission fiber are used (each having a power loss of 0,22 dB/km and a length such as to provide a total span loss of approximately 25 dB), separated by four amplifying line site 40.

Figure 7:
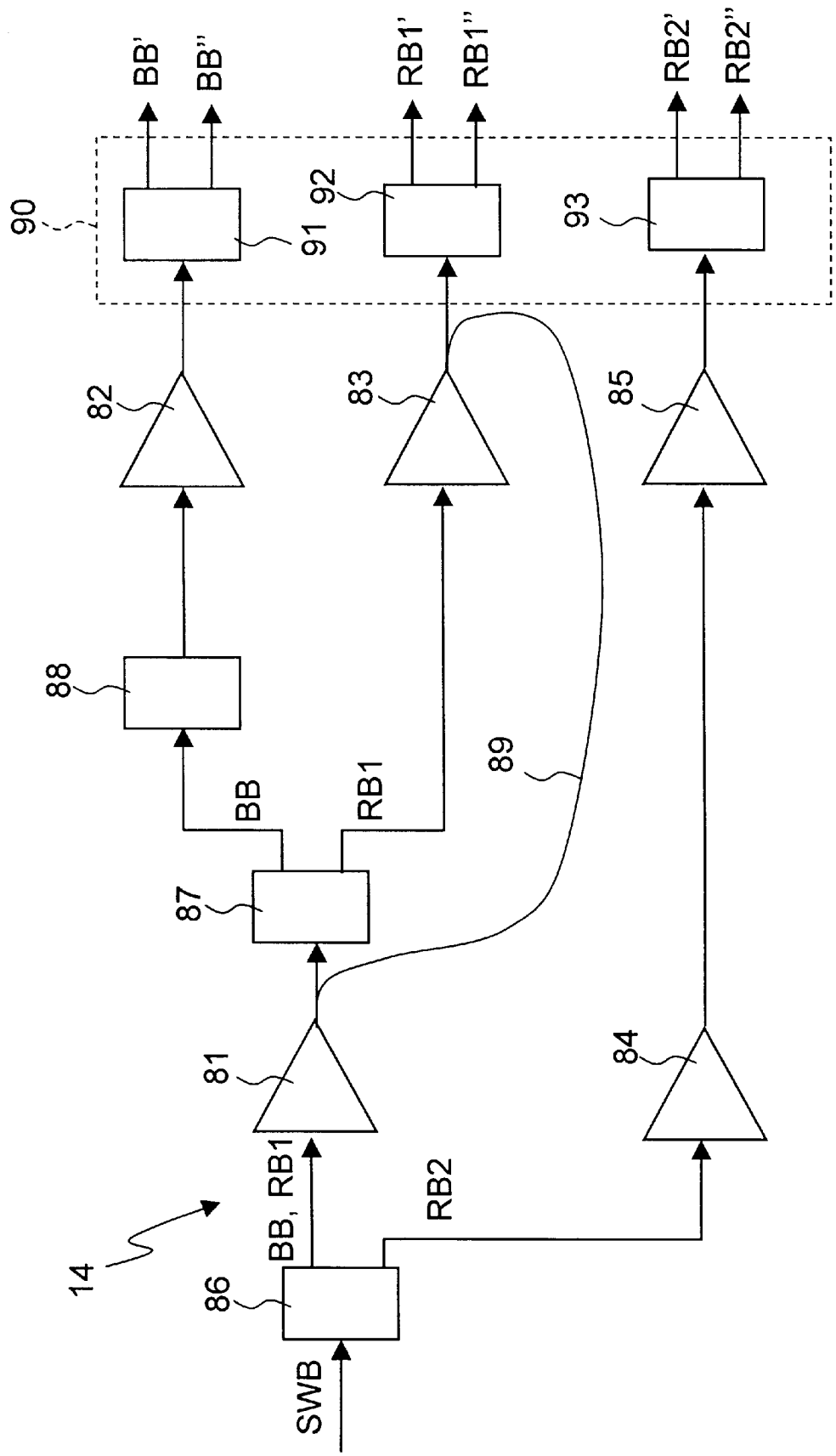
FIG. 7 is a detailed diagram of a receiver pre-amplifier section of the optical transmission system of FIG. 1.

Following the final span of transmission fiber, RPA section 14 receives the single wide-band SWB from last line site 40 and prepares the signals of the single wide-band SWB for reception and detection at the end of the communication link. As shown in FIG. 7, RPA section 14 may include amplifiers (AMP) 81–85, filters 86 and 87, an equalizing filter 88 and, if necessary, three router modules 91–93.

Filter 86 receives the single wide-band SWB and separates the RB2 band from the BB and RB1 bands. Amplifier 81 is preferably doped with erbium and amplifies the BB and RB1 bands to help improve the signal-to-noise ratio for the channels in the BB and RB1 bands. Amplifier 81 is pumped, for example, with a 980 nm pump or with a pump at some other wavelength to provide a low noise figure for the amplifier. The BB and RB1 bands are in turn separated by filter 87.

As with TPA section 12 and line site 40, amplifier 82 and 83 amplify the BB band and, respectively, the RB1 band, with a 980 nm pumping. To help stabilize the output power between channels in the RB1 band, amplifier 81 and 83 are preferably pumped with the same 980 nm laser diode pump source, by using a joining optical fiber 89 that transmits the residual 980 nm pump signal with relatively low loss. Specifically, amplifier 81 is associated with a WDM coupler, positioned between amplifier 81 and filter 87, that extracts the 980 nm pump light that remains at the output of amplifier 81. This WDM coupler may be, for example, model number SWDMCPR3PS110 supplied by E-TEK DYNAMICS, INC., 1885 Lundy Ave., San Jose, Calif. (USA). The output from this WDM coupler feeds into a second WDM coupler of the same type and positioned in the optical path after amplifier 83. The two couplers are joined by an optical fiber 89 that transmits the residual 980 nm pump signal with relatively low loss. The second WDM coupler passes the residual 980 nm pump power into amplifier 83 in a counter-propagating direction. Thus, amplifiers 81–83, filter 87 and equalizing filter 88 perform the same functions as amplifiers 64, 65 and 67, filter 71, and equalizing filter 74, respectively, of line site 40 and may comprise the same or equivalent parts depending on overall system requirements.

Amplifier 84 is coupled to filter 86 to receive and amplify the RB2 band. Amplifier 84 is, for example, an erbium-doped amplifier identical to the amplifier 68 of FIG. 6. RB2 band channels are then received by amplifier 85 that is, preferably, an erbium-doped amplifier of a known type.

RPA section 14 further comprises a routing stage 90, which permits to adapt the channel spacing within the BB, RB1 and RB2 bands to the channel separation capability of demultiplexing section 15. In particular, if the channel separation capability of demultiplexing section 15 is for a relatively wide channel spacing (e.g. 100 GHz grid) while channels in WDM system 1 are densely spaced (e.g. 50 GHz), then RPA section 14 could include the routing stage 90 shown in FIG. 7. Other structures may be added to RPA section 14 depending on the channel separation capability of demultiplexing section 15.

Routing stage 90 includes three router modules 91–93. Each router module 91–93 separates the respective band into two sub-bands, each sub-band including half of the channels of the corresponding band. For example, if the BB band includes sixteen (16) channels $\lambda_1$–$\lambda_{16}$, each separated by 50 GHz, then router module 91 would split the BB band into a first subband BB' having channels $\lambda_1, \lambda_3, \ldots, \lambda_{15}$ separated by 100 GHz and a second subband BB" having channels $\lambda_2, \lambda_4, \ldots, \lambda_{16}$ separated by 100 GHz and interleaved with the channels in the subband BB'. In a similar fashion, router modules 92 and 93 would split the RB1 band and the RB2 band, respectively, into first subbands RB1' and RB2' and second sub-bands RB1" and RB2".

Each router module 91–93 may, for example, include a coupler (not shown) that has a first series of Bragg gratings attached to a first port and a second series of gratings attached to a second port. The Bragg gratings attached to the first port would have reflection wavelengths that correspond to every other channel (i.e. the even channels), while the Bragg gratings attached to the second port would have reflection wavelengths that correspond to the remaining channels (i.e. the odd channels). This arrangement of gratings will also serve to split the single input path into two output paths with twice the channel-to-channel spacing.

After passing through RPA section 14, the BB, RB1 and RB2 bands or their respective subbands are received by demultiplexing section 15. As shown in FIG. 8, demultiplexing section 15 includes six wavelength demultiplexers (WDs) 95', 95", 96', 96", 97', 97" which receive the respective sub-bands BB', BB", RB1', RB1", RB2' and RB2" and generate the output channels 17. Demultiplexing section 15 further includes receiving units Rx1–Rx128 for receiving the output channels 17.

The wavelength demultiplexers preferably comprise arrayed waveguide grating devices, but alternate structures for achieving the same or similar wavelength separation are contemplated. For instance, one may use interferential filters, Fabry-Perot filters, or in-fiber Bragg gratings in a conventional manner to demultiplex the channels within the sub-bands BB', BB", RB1', RB1", RB2', RB2".

In a preferred configuration, demutiplexer section 15 combines interferential filter and AWG filter technology. Alternatively, one may use Fabry-Perot filters or in-fiber Bragg gratings. WDs 95', 95", which are preferably eight channel demultiplexers with interferential filters, receive and demultiplex first sub-band BB' and second sub-band BB", respectively. Specifically, WD 95' demultiplexes channels $\lambda_1, \lambda_3, \ldots, \lambda_{15}$, and WD 95" demultiplexes channels $\lambda_2, \lambda_4, \ldots, \lambda_{16}$. Both WD 95' and WD 95", however, may be 1×8 type AWG 100 GHz demultiplexers. Similarly, WDs 96' and 96" receive and demultiplex first sub-band RB1' and second sub-band RB1", respectively, to produce channels $\lambda_{17}$–$\lambda_{64}$ and WDs 97' and 97" receive and demultiplex first sub-band RB2' and second subband RB2", respectively, to produce channels $\lambda_{65}$–$\lambda_{128}$. Both WD 96' and WD 96" may be 1×32 type AWG 100 GHz demultiplexers that are underequipped to use only twenty-four of the available demultiplexer ports and both WD 97' and WD 97" may be 1×32 type AWG 100 GHz demultiplexers that uses all the available demultiplexer ports. Output channels 17 are composed of the individual channels demultiplexed by WDs 95', 95", 96', 96", 97', 97", and each channel of output channels 17 is received by one of receiving units Rx1–Rx128.

Figure 9:
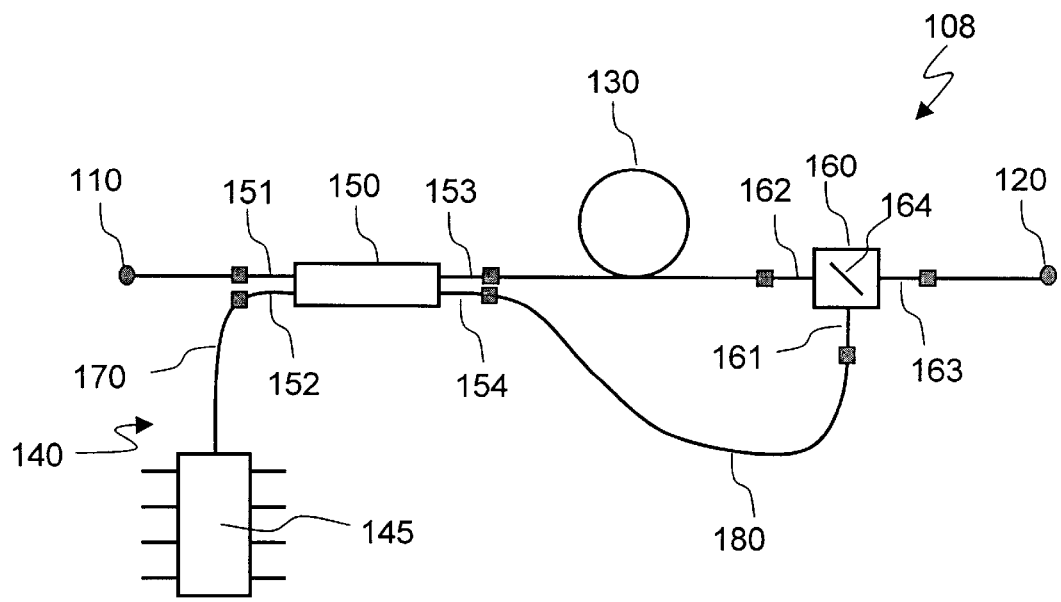
FIG. 9 is a schematic representation of an optical amplifier including the pumping device of the invention.

FIG. 9 illustrates an optical amplifier 108 including a pumping device according to the present invention. Optical amplifier 108 can be for example used in the optical transmission system 1 to amplify signals in the RB2 band and is included in the amplifier sections 53 of FIG. 4 and 69 of FIG. 6.

Amplifier 108 is a bidirectionally-pumped optical amplifier including an input port 110 for the input of optical signals to be amplified, an output port 120 for the output of the optical signals after amplification, an active fiber 130 that optically couples the input port 110 to the output port 120 and is adapted to amplify the optical signals, a pump source 145 for generating pump radiation and a pumping device 140 optically coupling to the active fiber 130 said pump radiation.

Figure 11A:
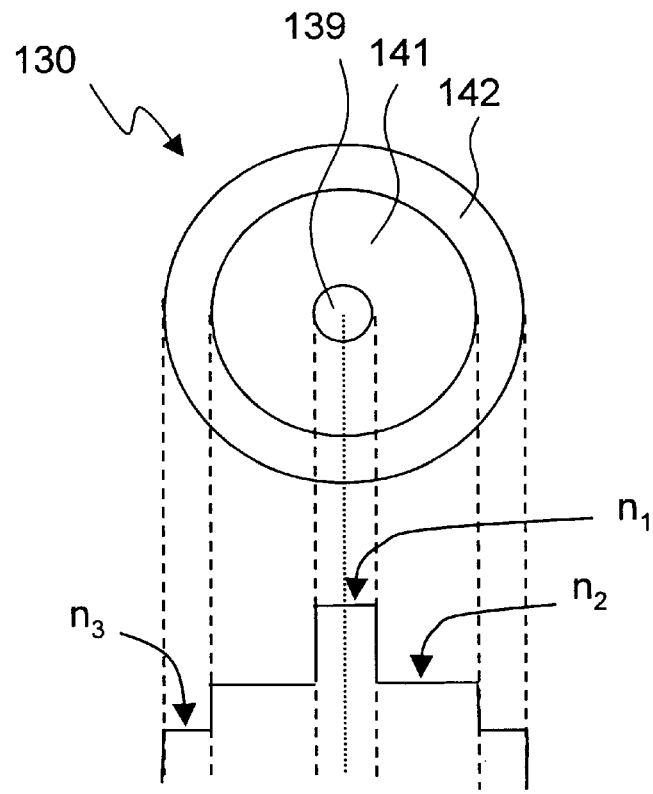
FIGS. 11a and 11b are schematic representations of a double-cladding fiber used in the optical amplifier of the invention and of the multi-mode pumping operation of a double cladding fiber.
Figure 11B:
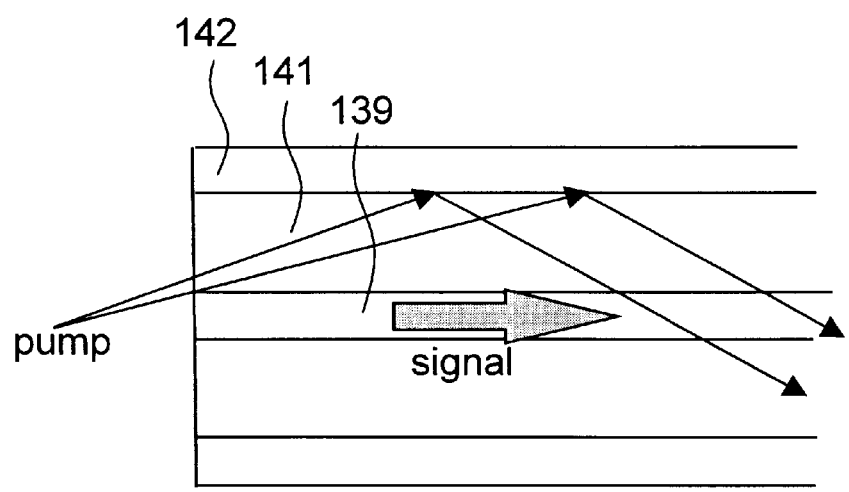

The active fiber 130 is, for example, a double-cladding fiber co-doped with erbium and ytterbium and will be hereinafter described in details with reference to FIG. 11a, where a not-in-scale section of optical fiber 130 is shown. Fiber 130 includes a core 139 having a first refraction index $n_1$, an inner cladding 141 that surrounds the core 139, is coaxial to the core 139 and has a second refraction index $n_2 < n_1$, and an outer cladding 142 that surrounds the inner cladding 141, is coaxial to the inner cladding 141 and has a third refraction index $n_3 < n_2$. As shown in FIG. 11b, under normal operating conditions of amplifier 108, while the transmitted signals are confined into the core 139, the pump radiation is fed into the inner cladding 141 and is progressively absorbed by the core 139, exciting the active medium.

The active fiber 130 has, for example, an external diameter of the outer cladding 142 of 90 $\mu$m, an external diameter of the inner cladding 141 of 65 $\mu$m and an external diameter of the core 139 of about 5 $\mu$m. The core 139 may, for example be composed by $SiO_2/P_2O_5/Al_2O_3$ co-doped with ErYb, and may have a weight percentage of $P_2O_5$ greater than 10% (preferably about 20%), a weight percentage of $Al_2O_3$ less than 2%, a concentration of erbium between 600 ppm and 1000 ppm and a concentration of ytterbium between 1000 ppm and 20000 ppm. For example, the ratio between ytterbium and erbium concentrations is about 20:1. The refraction index step between the core 139 and the inner cladding 141 is for example $\Delta n = n_1 - n_2 = 0.013 \pm 0.002$ and the refraction index step between the inner cladding 141 and the outer cladding 142 is for example $\Delta n' = n_2 - n_3 = 0.017 \pm 0.003$ (due mainly to a fluoride doping of the outer cladding 142). The core 139 and the inner cladding 141 define a single-mode waveguide for the conveying of transmission signals, having for example a first numeric aperture $NA_1 = 0.19 \pm 0.02$, while the inner cladding 141 and the outer cladding 142 define a multi-mode waveguide for the conveying of pump radiation, having for example a second numeric aperture $NA_2 = 0.22 \pm 0.01$.

To produce fiber 130, two different preforms (not shown) are used. A first preform is used to obtain the core 139 and the inner cladding 141 and is made by deposing $SiO_2$ and $P_2O_5$ by means of the known "chemical vapor deposition" (CVD) method, and then by introducing the rare earths erbium and ytterbium by means of the known "solution doping" method. The first preform is opportunely worked so as to obtain preset geometrical ratios between the core 139 and the inner cladding 141.

A second preform of a commercial-type is used to obtain the outer cladding 142. The second preform has a central region of pure $SiO_2$ and a surrounding region of fluoride-doped $SiO_2$. The central region of the second preform is removed so as to obtain a central longitudinal hole in which the first preform is introduced. The three-layer preform so obtained is drawn in the usual way to obtain the optical fiber 130.

Referring again to FIG. 9, the pumping device 140 includes a first optical coupler 150 that optically couples the pump source 145 to the active fiber 130 and a second optical coupler 160 optically coupled to the first coupler 150 to receive from the first coupler 150 the residual pump radiation (i.e. the fraction of the pump radiation that has not been directly fed to active fiber 130 by the first coupler 150) and to feed the residual pump radiation to the active fiber 130.

The pump source 145 is preferably a multi-modal laser, providing a pumping radiation between 920 nm and 980 nm with a pumping power of 400 mW. Pump source 145 is optically coupled to optical coupler 150 by means of a multi-modal optical fiber 170. Pump source 140 may be, for example, model number MECP7PR6 supplied by E-TEK DYNAMICS, INC., 1885 Lundy Ave., San Jose, Calif. (USA).

The first optical coupler 150 has an insertion loss for the optical signals not greater than 0.2 dB and the second optical coupler 160 has a pump coupling efficiency preferably not less than 70%, and more preferably not less than 80%. In other words, the optical signals transmitted from input 110 to active fiber 130 undergo, by passing through the first coupler 150, an attenuation not greater than 0.2 dB and the residual pump radiation is coupled to the active fiber 130 by means of the second coupler 160 with a coupling efficiency not less than 70%.

Preferably, the first optical coupler 150 is a fused fiber coupler having an insertion loss for the optical signals of approximately 0.1 dB, for example a double cladding WDM coupler of the type 960/1550 nm or 920/1550 nm. For example, couplers 124 and 126 are model MW9850-P05 made by the Applicant.

The first coupler 150 has a first access fiber 151, for example a double-cladding fiber, optically coupled to the input port 110 to receive the signals to be amplified; a second access fiber 152, for example a multi-modal (with single cladding) fiber, optically coupled to the pump source 140 to receive pump radiation; a third access fiber 153 of the same type of first access fiber 151, optically coupled to the active fiber 130 to feed to the active fiber 130 the optical signals to be amplified together with a first fraction of the pump radiation, which represents approximately 50% (typically about 48%) of the power of the pump radiation; and a fourth access fiber 154 of the same type of the second access fiber 152, that carries a second fraction of the pump radiation, which defines the residual pump radiation.

Optical coupler 160 is a micro optics (mirror-type) double cladding WDM coupler having a pump coupling efficiency of approximately 90%. Couplers 160 may be, for example, model number FWDMCPR1PRS10 supplied by E-TEK DYNAMICS, INC., 1885 Lundy Ave., San Jose, Calif. (USA). Coupler 160 includes a first, a second and a third access fiber 161, 162, 163, a converging lens system not shown, to opportunely shape and direct the light beams among its access fibers, and a reflection-selective surface, e.g. a dichroic mirror, indicated with 164 and represented schematically with an oblique segment. The actual inclination of the dichroic mirror inside the coupler depends on the direction of the incoming optical beams carrying the signal and the pump radiation.

The selective-reflection surface in couplers 111 and 112 is transparent for the wavelengths of the RB2 band channels and reflecting for the wavelength of the pumping radiation. In this way, the RB2 band channels pass through the reflecting surface substantially without losses while the pump radiation is reflected by the reflecting surface into the cladding of the amplification fiber 130. Alternatively, coupler 160 may include a selective-reflection surface that is reflecting for the wavelengths of the RB2 band channels and transmissive for the wavelength of the pumping radiation.

Coupler 160 has its first access fiber 161 optically coupled, by means of a pump optical fiber 180, preferably a multi-modal fiber, to the fourth access fiber 154 of the first optical coupler 150 so as to receive the second fraction of the pump radiation, i.e. the residual pump radiation; a second access fiber 162 optically coupled to the active fiber 130 to receive from the active fiber 130 the amplified optical signals and to feed to the inner cladding of the active fiber 130 a main fraction (about 90%) of the second fraction of the pump radiation (reflected by mirror 164); and a third access fiber 163 optically coupled to the output port 120 to feed to the output port 120 the amplified optical signals, transmitted through mirror 164.

More in details, in the preferred embodiment here disclosed, the first access fiber 161 is a multi-mode fiber having a core diameter of 65 μm, a cladding diameter of 90 μm and a numeric aperture NA=0.22; the second access fiber 162 is a double-cladding fiber having the same geometrical characteristics of amplification fiber 108; and the third access fiber 163 is a single-mode fiber having a core wavelength cutoff of 1300 nm±30 nm, a cladding diameter of 125 μm and a numeric aperture NA=0.2.

Coupler 160 has an insertion loss of approximately 1.02 dB, measured at 1550 nm, for optical signals passing from the second access fiber 162 to the third access fiber 163, and an insertion loss of approximately 0.22 dB, measures at 980 nm, for optical signals passing from the first access fiber 161 to the second access fiber 162. Furthermore, coupler 160 has an optical isolation greater than 30 dB, measured at 980 nm, between the second access fiber 162 and the third access fiber 163, and an optical isolation greater than 20 dB, measured at 1550 nm, between the first access fiber 161 and the second access fiber 162.

The particular coupling arrangement hereinbefore described is adapted to feed to the active fiber 130 approximately 85% of the pump power generated by the pump source 140 and provides therefore a very high efficiency pumping.

The coupling of the residual pump radiation into the active fiber 130 by means of the second coupler 160 is substantially independent from the mode distribution of the pump radiation received by the second coupler 160, so that the pump optical fiber 180 may be a typical multi-modal fiber and no scrambling device to redistribute the energy between optical modes is needed. The residual pump radiation is then transmitted from the first coupler 150 to the second coupler 160 without a substantial energy transfer between modes.

In alternative arrangements not shown, the second coupler 160 may be optically coupled to a further active fiber positioned in series to the above-described active fiber 130, so as to feed the residual pump radiation to the further active fiber in a co-propagation direction (if the second coupler is positioned between the two active fibers) or in a counter-propagation direction (if the second coupler is positioned down-stream with respect to the further active fiber). The first of the two alternative arrangements is preferred in that the further active fiber can compensate the signal power loss due to the second coupler.

Pump device 140 has been tested together with the optical amplifier 108, by feeding an optical signal at 1550 nm to the input 110 with an input power of +3 dBm and detecting it at the output 120. Using Er/Yb active fiber with a length of 4 m, the following results have been obtained:

Output power=17 dBm

Noise Figure=5.8 dB

The Applicant has also tested, in the same experimental conditions but using an active fiber with a length of 6 m, a pump device including a single micro-optic coupler in a co-propagating pumping scheme or in a counter-propagating scheme, obtaining the following results:

Co-propagating pumping scheme:

Output power=16.8 dBm

Noise Figure=6 dB

Counter-propagating pumping scheme:

Output power=17 dBm

Noise Figure=7 dB

These results confirm that, in the same conditions in terms of pumping power and transmission wavelength, the pumping device of the invention offers better performances with respect to a pump device at least in terms of noise figure.

Figure 10:
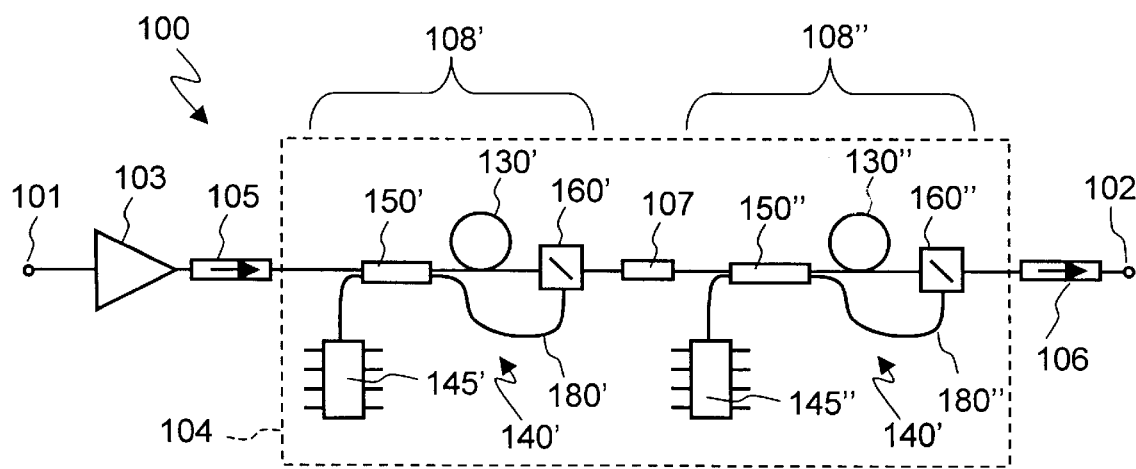
FIG. 10 is a schematic representation of an amplification section including the amplifier of FIG. 9.

FIG. 10 illustrates an amplifying unit 100 which is a preferred embodiment for the amplifier sections 53 of FIG. 4 and 69 of FIG. 6 and is adapted to amplify the RB2 band channels up to 22 dBm. Amplifying unit 100 substantially comprises a pre-amplifier 103 and a double-stage amplifier 104, each stage of amplifier 104 being the same type of amplifier 108 of FIG. 9.

In details, amplifying unit 100 includes an input 101, an output 102, an erbium fiber pre-amplifier 103, an erbium/ytterbium fiber amplifier 104, a first optical isolator 105 and a second optical isolator 106. Preamplifier 103 and amplifier 104 are arranged in series and the pre-amplifier 103 is positioned between input 101 and amplifier 104 for providing a first amplification to the channels of RB2 band received at the input 101. Pre-amplifier 103 may be, for example, a single-stage erbium-doped fiber amplifier of a known type, pumped at 970–980 nm. Pre-amplifier 103 receives the RB2 band from the input 101 and amplifies the RB2 channels to a first power level, up to 15–17 dBm. The first amplification performed by pre-amplifier 103 is important to reach a high power level at the output of amplifier 104. Pre-amplifier 103 also improves the noise figure (NF) of the amplifying section 100 and permits to equalize the RB2 band channels.

The first isolator 105 is positioned between pre-amplifier 103 and amplifier 104 and is adapted to block light directed from amplifier 104 towards pre-amplifier 103. The second isolator 106 is positioned between amplifier 104 and output 102 and is adapted to block the light directed from output 102 towards optical amplifier 104. The first or the second isolator 105, 106 may be differently positioned or omitted, or other isolators may be added between the input 101 and the output 102, depending on system requirements.

Amplifier 104 is a double stage amplifier, each stage having a bi-directional pumping. Amplifier 104 includes a first and a second amplification stage 108', 108" which are substantially the same as optical amplifier 108 of the invention and whose parts are indicated with the same reference numbers as in FIG. 9 and are distinguished by apex. First and second amplification stages 108', 108" differ only in the length of the respective active fibers, which is preferably 16 m for fiber 130' and 18 m for fiber 130".

A noise rejection filter 107 is preferably positioned between the two amplification stages 108' and 108" to suppress part of the amplified spontaneous emission of fiber 130' and 130".

The pump device of the invention, with respect to a pump device including a single dichroic coupler (which offers better performances with respect to pump devices using fused fiber couplers) provides output signal powers substantially of the same order but allows a better distribution of the pump radiation into the active fiber offering better performances in terms of noise figure, in particular thanks to the more homogeneous population inversion and the lower insertion loss.

It should be readily ascertained by those skilled in the art that the invention is not limited by the embodiments described above which are presented herein as examples only. Pumping device 140, optical amplifier 108, amplifying unit 100 and transmission system 1, in fact, may be modified in various ways within the scope of protection as defined by the appended patent claims.

In particular, the pump device of the invention can also be advantageously used to pump a multi-modal active fiber (or more than one multi-modal active fibers) instead of a double cladding fiber. In this case, the access fibers of the first and the second coupler 150, 160 that are directly coupled to the active fiber are multi-modal fibers.

Furthermore, in a less preferred embodiment, the order of the two couplers may be changed, so that the fused fiber coupler feeds pump radiation to the active fiber in a counter-propagation direction with respect to the transmitted signals, and the micro optic coupler feeds the residual pump radiation to the active fiber in a co-propagation direction with respect to the transmitted signals.

Moreover, the use of the pump device and of the optical amplifier of the invention of the invention in not restricted to the particular signal transmission wavelength band and pump radiation wavelength band hereinbefore considered and can be used, for example, to pump active fibers operating in the whole emission range of Er/Yb, between about 1525 and 1620 nm.

What is claimed is:

1. Pump device for coupling a pump radiation into an active fiber of an optical amplifier, said active fiber being a double-cladding fiber, said optical amplifier being adapted to amplify optical signals, said pump device including a multi-mode optical fiber to receive and convey a multi-mode pump radiation, a first optical coupler for optically coupling a first fraction of said pump radiation to said active fiber, a second optical coupler that is optically coupled to said first coupler to receive from said first coupler a second fraction of said pump radiation and that is further optically coupled to said active fiber to feed to said fiber at least part of the second fraction of said pump radiation, characterized in that said first optical coupler has an insertion loss for said optical signals less than or equal to 0.2 dB and said second optical coupler has a coupling efficiency for said pump radiation of at least 70%.

2. Pump device according to claim 1, wherein said first optical coupler is a fused fiber coupler and said second optical coupler is a micro optic coupler.

3. Pump device according to claim 1, wherein the sum of the optical power of the first fraction of said pump radiation and of the optical power of said at least part of the second fraction of said pump radiation is more than 75% of the optical power of said pump radiation.

4. Pump device according to claim 3, wherein said sum is at least 85% of the optical power of said pump radiation.

5. Pump device according to claim 1, further comprising a pump optical fiber optically coupling said second optical coupler to said first optical coupler; said pump optical fiber being a multi-modal optical fiber adapted to transmit optical radiation without substantial energy transfer between modes.

6. Pump device according to claim 1, wherein said first optical coupler has a first access fiber; a second access fiber that is a multi-modal fiber and is optically coupled to said multi-mode optical fiber to receive said pump radiation; a third access fiber that is of the same type of said first access fiber adapted to be coupled to said active fiber to feed to said active fiber the first fraction of said pump radiation; and a fourth access fiber, of the same type of said second access fiber, into which said second fraction of said pump radiation is conveyed; and said second coupler has a first access fiber that is a multi-modal fiber optically coupled to said fourth access fiber of said first optical coupler to receive the second fraction of said pump radiation; a second access fiber that is a double-cladding fiber adapted to be coupled to said second active fiber to feed to said second active fiber said at least part of the second fraction of said pump radiation, and a third access fiber for conveying said optical signals.

7. Pump device according to claim 6, wherein said first access fiber of said first coupler is a single-mode fiber adapted to be coupled to an optical input to receive said optical signals and said third access fiber of said second coupler is a single-mode fiber adapted to be coupled to an optical output to feed to said optical output said optical signals.

8. Optical amplifier including an optical input for the input of optical signals, an optical output for the output of said optical signal, an active fiber interposed between said input and said output and adapted to amplify said optical signals, a pump source for generating a pump radiation and a pumping device according to claims 1, 6 or 7 to optically couple said pump radiation to said active fiber.

9. Optical amplifier according to claim 8, wherein said active fiber comprises two fiber sections, each coupled to a respective one of the two couplers.

10. Optical amplifying unit including two optical amplifiers according to claim 8 arranged in series.

11. Optical amplifying unit according to claim 10, further comprising a pre-amplifier arranged in series with said optical amplifiers.

12. Optical amplifying unit according to claim 10 further comprising at least one noise rejection filter arranged in series with said optical amplifiers.

13. Optical transmission system including an optical transmitting unit adapted to transmit an optical signal, an optical receiving unit to receive said optical signal, an optical fiber link optically coupling said transmitting unit to said receiving unit, further comprising an active fiber positioned along said optical fiber link to amplify said optical signal, a pump source to generate pump radiation and a pump device according to claims 1 or 6 to couple said pump radiation to said active fiber.

14. Method for coupling a pump radiation into an active fiber adapted to amplify optical signals, said active fiber being a double-cladding fiber, the method comprising the following steps:

guiding an optical signal;

guiding a multimode pump radiation;

inputting said optical signal and said pump radiation to said active fiber; said optical signal being input with a predetermined insertion loss and said pump radiation being input so as to feed a first power fraction to said active fiber and to obtain a residual power fraction;

inputting said residual power fraction to said active fiber with a predetermined coupling efficiency so as to feed a second power fraction to said active fiber;

characterized in that said insertion loss is lower than or equal to 0.2 dB and said coupling efficiency is at least 70%.

15. Method according to claim 14, wherein the sum of said first and second power fractions is more than 75% of the optical power of said pump radiation.

16. Method according to claim 15, wherein said sum is at least 85% of the optical power of said pump radiation.

17. Optical amplifying unit including two optical amplifiers according to claim 9 arranged in series.

18. Optical amplifying unit according to claim 17, further comprising a pre-amplifier arranged in series with said optical amplifiers.

19. Optical amplifying unit according to claim 17, further comprising at least one noise rejection filter arranged in series with said optical amplifiers.

* * * * *